United States Patent
Othmer (10) Patent No.: US 8,733,939 B2
(45) Date of Patent: May 27, 2014

(54) VEHICLE CONTENT PROJECTION

(75) Inventor: Konstantin Othmer, Los Altos Hills, CA (US)

(73) Assignee: Cloudcar, Inc., Los Altos, CA (US)

( * ) Notice: Subject to any disclaimer, the term of this patent is extended or adjusted under 35 U.S.C. 154(b) by 75 days.

(21) Appl. No.: 13/559,020

(22) Filed: Jul. 26, 2012

(65) Prior Publication Data

US 2014/0028980 A1   Jan. 30, 2014

(51) Int. Cl.
*G03B 21/00* (2006.01)

(52) U.S. Cl.
USPC ............ 353/13; 353/70; 353/69; 353/79; 359/443; 359/451

(58) Field of Classification Search
USPC .......... 353/13, 69, 70, 79; 359/451, 443, 449; 348/743–747, E3.044, E5.137, E5.144, 348/E5.145, E9.027; 349/5, 7–9
See application file for complete search history.

(56) References Cited

U.S. PATENT DOCUMENTS

| | | | |
|---|---|---|---|
| 5,580,140 A | 12/1996 | Katz et al. | |
| 7,520,616 B2 * | 4/2009 | Ooba et al. | 353/13 |
| 2010/0017111 A1 | 1/2010 | Stefani | |
| 2010/0253918 A1 * | 10/2010 | Seder et al. | 353/13 |
| 2011/0019112 A1 * | 1/2011 | Dolgoff | 349/8 |
| 2012/0044090 A1 * | 2/2012 | Kahler et al. | 340/905 |

FOREIGN PATENT DOCUMENTS

| | | |
|---|---|---|
| EP | 1 916 154 A1 | 4/2008 |
| GB | 2482951 A | 2/2012 |

OTHER PUBLICATIONS

Extended European Search Report dated Nov. 25, 2013 as received in Application No. 13176650.3.

* cited by examiner

*Primary Examiner* — Sultan Chowdhury
(74) *Attorney, Agent, or Firm* — Maschoff Brennan (57) ABSTRACT

In an example, a content projecting system includes a communication module configured to receive an instruction to project content. The content projecting system further includes a projector configured to be affixed to a vehicle. The projector is further configured to project the content onto a projection surface separate from the vehicle.

20 Claims, 7 Drawing Sheets

VEHICLE CONTENT PROJECTION

FIELD

The embodiments discussed herein are related to externally projecting content from a vehicle.

BACKGROUND

When operating an automobile, a driver may be focused on the automobile's surroundings. For example, the driver may focus on the road, signs, signals, other cars, people near or on the road, and the like. The driver may also have access to a great deal of information that may be of interest to the driver while operating the automobile.

Some of the information may be provided by the automobile itself and may deal with the state of the automobile. For example, the automobile may provide information to a driver about the automobile's speed, heading, fuel level, system warnings, maintenance reminders, and the like.

The automobile may also provide information concerning entertainment media being delivered within the automobile. For example, the automobile may provide information about entertainment media provided by a radio station, compact disk (CD), digital versatile disk (DVD), or the like. Information about the media may include a performer name, song or program name, volume level, and/or other information about the particular media. Many automobiles may also provide navigation information, including turn-by-turn directions, weather and traffic notices, and the like.

In addition to information from the automobile, the driver may have access to information from other devices as well. In particular, a driver may have a mobile phone, smartphone, laptop computer and/or tablet computer in the automobile. In addition to providing information stored on the device, these mobile devices may allow the driver to make or receive phone calls, send or receive short message service (SMS) or multimedia messaging service (MMS) messages. These mobile devices may further communicate with radio-access networks, including cellular networks and/or wireless local area networks (WLANs) while located in the automobile. The mobile device may also provide the driver with access to vast amounts of information via the internet, including information such as news headlines, sports scores, social media, games, instant messaging, email, and the like. The mobile device may also provide navigation information and/or deliver entertainment media.

In addition to providing the driver with information, the automobile and/or mobile devices may require input from the driver to perform some actions. For example, a stereo system may require the driver to interact with an interface to change the volume, change the radio station, or switch between CDs. Similarly, a mobile phone may require the driver to interact with a touchscreen or keypad to view or respond to a text message, receive a phone call, and/or access an application.

These applications and services require the driver's attention, some more than others. For example, changing the volume on a radio can be done without taking one's eyes off the road, but selecting a contact to call from a mobile phone address book requires looking at the phone, not the road. This sort of "distracted driving" has caused accidents and many states now have laws forbidding interacting with a mobile phones while driving. The National Highway Traffic Safety Administration (NHSTA) has provided guidelines to automakers to make sure that new cars discourage distracted driving. For example, the NHSTA guidelines attempt to discourage distracted driving by directing that new cars disable some feature of the navigation system such as blocking access to the address input screen in a navigation system while the car is in motion.

The focus of the NHSTA guidelines is to encourage drivers to keep their eyes on the road rather than being distracted with the interface of a mobile device or the car infotainment system. The NHSTA guidelines are often in direct conflict with drivers' desired behavior.

The subject matter claimed herein is not limited to embodiments that solve any disadvantages or that operate only in environments such as those described above. Rather, this background is only provided to illustrate one example technology area where some embodiments described herein may be practiced.

SUMMARY

Thus, a system that allows a driver to interact with a mobile device or car infotainment system while focusing on the road may discourage distracted driving while improving driver satisfaction. Accordingly, some embodiments described herein generally relate to projecting content in front of a vehicle, such as onto a road in front of the vehicle or onto the back of another vehicle. By projecting the content in front of the vehicle, the driver can see the content without taking his/her eyes off of the road. In some embodiments, the content may be projected a sufficient distance in front of the vehicle such that the driver does not have to shift focus from the projected content to the road ahead and vice versa. While the content may be projected in front of and apart from the vehicle, the driver may be able to provide input to select or otherwise interact with the content within the vehicle via, e.g., buttons on the steering wheel and/or voice input. Optionally, threat analytics may be applied to determine whether it is safe to project the content or whether the projection of the content should be at least temporarily suppressed.

In an example embodiment, a content projecting system that may be used in a vehicle includes a communication module configured to receive an instruction to project content. The content projecting system further includes a projector configured to be affixed to a vehicle. The projector is further configured to project the content onto a projection surface separate from the vehicle.

In another example embodiment, a vehicle includes a communication module, an imaging module, a projector, and a safety module. The communication module is configured to receive an instruction to project content configured to convey information to a driver of the vehicle. The imaging module is configured to pre-distort the content such that the content appears substantially undistorted from a perspective of the driver when projected onto a projection surface separate from the vehicle. The projector is configured to project the content onto the projection surface such that the content is at least partially viewable by the driver of the vehicle. The safety module is configured to suppress the projector from projecting the content when a threat analytic exceeds a threshold.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Although an automobile's driver may have access to vast amounts of information that may be of interest to the driver, accessing the information while operating the automobile may be dangerous. For example, the driver may be required to look at a media system, navigation system, dashboard, and/or mobile device to receive information from the devices. In some instances, the driver may be further required to interact with the system or device to prompt it to display the information or to perform an action. For example, to read an SMS message received on a mobile device, a driver may be required to retrieve the mobile device and navigate through the mobile device's interface. In doing so, the driver may be required to stop focusing on the road for a time. When focusing on something inside the automobile, the driver may be less likely or slower to notice and/or react to dangerous situations developing outside of the automobile.

Some automobiles attempt to counteract this danger by projecting information onto a portion of the automobile's windshield. However, such systems may prompt the driver to focus on the windshield and not on the road ahead. Doing so may still leave the driver less likely or slower to notice and/or react to dangerous situations developing outside of the automobile.

To overcome these and other problems, some embodiments described herein include a content projecting device that allows a driver to receive information while keeping his/her eyes on the road and without shifting focus to the inside of the vehicle. The content projecting system may project content onto a surface separate from the vehicle to communicate information to the vehicle's driver. The content projecting system may modify/update the projected content in response to input from the driver. Projecting the content onto a surface separate from the vehicle may allow the driver of the vehicle to navigate and operate the user interface without requiring the driver to take his/her eyes off the road or shift focus to the inside of the vehicle. The content projecting system may also be used to project content to be viewed by other occupants of the vehicle, occupants of other vehicles, pedestrians, and the like. In some instances, the system may project content such as an image as a personalized expression or may be used to provide information to people outside of the vehicle.

Reference will now be made to the drawings to describe various aspects of some example embodiments of the invention. The drawings are diagrammatic and schematic representations of such example embodiments, and are not limiting of the present invention, nor are they necessarily drawn to scale.

Figure 1:
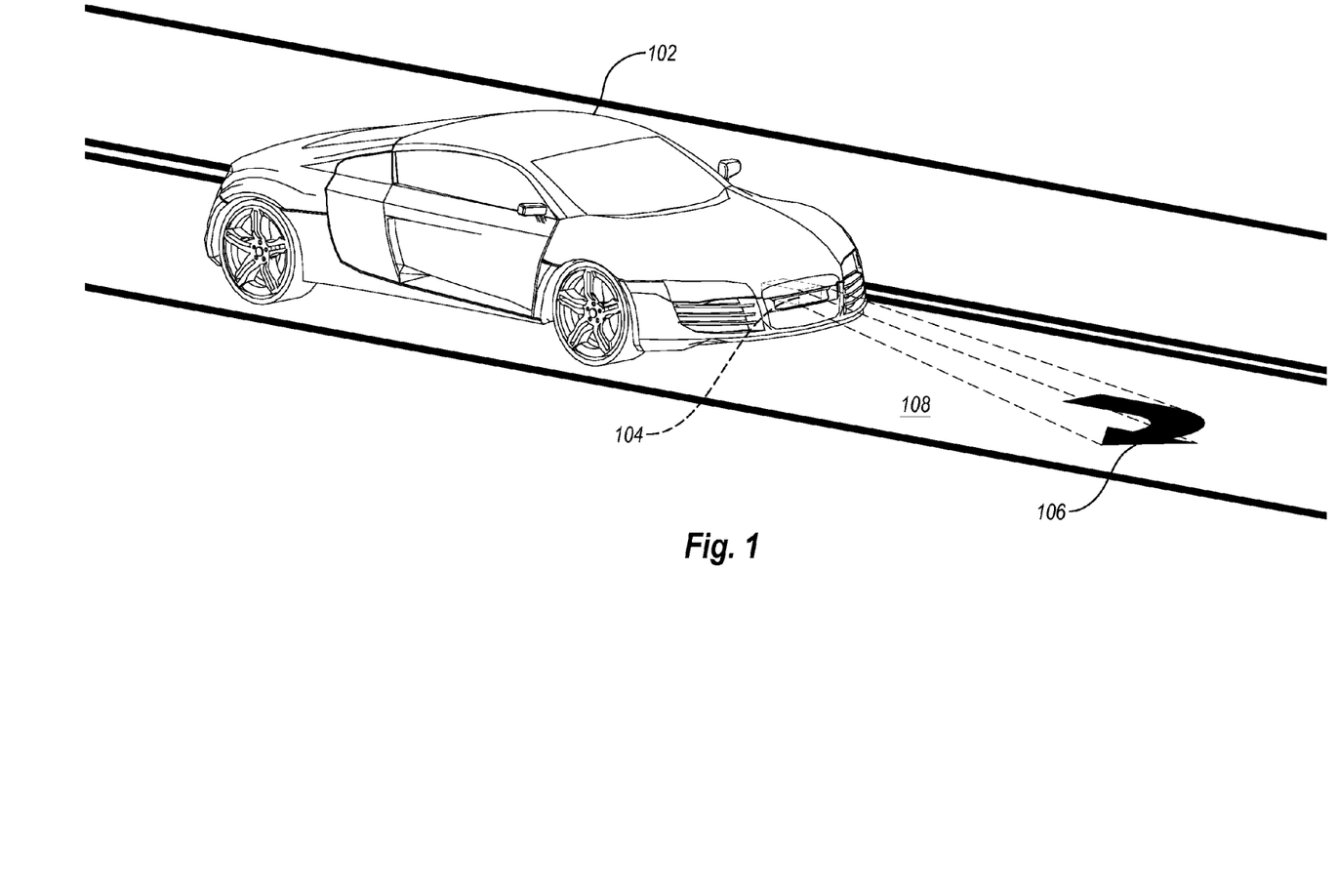
FIG. 1 illustrates an example vehicle including a content projecting system.

FIG. 1 illustrates an example vehicle 102 including a content projecting system 104. Although illustrated as an automobile, the vehicle 102 may more generally include any vehicle in which it may be desirable to project content onto a path of travel of the vehicle such that a driver of the vehicle can view the content without taking his/her eyes off the path of travel and without substantially shifting his/her focus. Generally, for example, the vehicle 102 may include a motorized vehicle such as a car, a truck, a motorcycle, a tractor, a semi-tractor, an airplane, a motorized boat, or the like, or even a non-motorized vehicle such as a bicycle, a wheelchair, a sailboat, or the like—provided a suitable power supply for the content projecting system 104 is provided.

The content projecting system 104 projects content 106 onto a projection surface 108 that is generally in a path of travel of the vehicle 102. The content 106 may be visible to the driver of the vehicle 102 and may convey information to a driver of the vehicle 102 such that the driver may view the information without shifting focus into the vehicle 102. Accordingly, the content projecting system 104 may include a projector as described with respect to FIG. 2. Alternately or additionally, the content projecting system 104 may include a camera coupled via a feedback loop to the projector as described with respect to FIG. 2. The feedback from the camera may be used to determine where to project the content 106 to maximize legibility of the content 106 to occupants of the vehicle 102, for instance.

The content 106 may also be visible to other occupants of the vehicle 102 and/or to people outside of the vehicle, such as occupants of other vehicles, pedestrians, and the like. As such, the content 106 may convey information to other occupants of the vehicle 102 and/or to observers outside of the vehicle 102. In some embodiments, the content 106 acts as a personalized expression of the driver and/or occupants of the vehicle. Alternately or additionally, the content 106 may include an advertisement or the like.

Information conveyed by the content 106 may be provided by any of a wide variety of sources, such as the vehicle 102 itself, a component such as a radio or navigation system of the vehicle 102, a mobile device such as a mobile phone, a laptop computer, or a tablet computer associated with the driver or an occupant of the vehicle 102, or the like or any combination thereof. Accordingly, information conveyed by the content 106 may include or relate to a state of the vehicle 102. For example, the information may include a heading, a speed, a fuel level, an interior or exterior temperature, a maintenance reminder, and/or other state of the vehicle 102.

Alternately or additionally, the content 106 may convey safety alerts concerning operation of the vehicle 102. For example, the content 106 may alert the driver if the vehicle 102 is drifting out of a designated lane, may alert the driver of other automobiles in the driver's blind spots, and the like.

As another example, the content 106 may convey navigation information as illustrated in FIG. 1. For example, the content 106 may convey information corresponding to turn-by-turn directions generated by a navigation system. Examples of navigation systems may include navigation systems built into the vehicle 102, standalone navigation systems, and navigation applications installed on mobile devices. In these and other embodiments, the content 106 may include arrows, text, distance indications, highlight a lane or turn, landmark identifiers, road identifiers, business logos, and/or other content that may assist a driver and/or an occupant of the vehicle 102 with navigation.

The content 106 may convey information from a mobile device located within the vehicle 102. For example, the content 106 may convey information about a phone call received on a mobile phone. The content 106 may indicate that the mobile phone is receiving a phone call, and/or may display a phone number of a caller, a name of a caller, or the like. Alternately or additionally, the content 106 may indicate that the mobile phone has received an SMS message, an MMS message, an email message, an instant message and/or may display all or a portion of the received message.

Information provided by an application of a mobile device may be conveyed by the content 106. For example, the content 106 may display social media such as posts from Facebook®, Twitter®, or other social networks. Mobile device applications may provide information via the content 106 to perform other functions, such as warning the driver of known speed traps, providing coupon offers for nearby businesses, displaying news headlines, and the like. The content projecting system 104 may optionally be used to facilitate automobile-based games for mobile devices.

The content 106 may convey information about entertainment media playing within the vehicle 102. For example, the content 106 may convey information identifying a radio station, an album name, a performer name, a track or program name, or the like. Such information may originate with a media system installed in the vehicle 102, and/or with a mobile device located within the vehicle 102.

In some embodiments, the content 106 may assist the driver of the vehicle 102 in controlling the vehicle, a component of the vehicle, or a mobile device. The content 106 may display options for the driver to "browse," "select," and/or "confirm" a selection or otherwise control the vehicle, component, or mobile device. For example, in response to receiving a spoken destination, a navigation system may display content 106 including a set of destination addresses representing the best guesses of what was spoken. The driver may select the correct address from the group of addresses via a suitable input device.

The content projecting system 104 may generally be coupled to a front end of the vehicle 102 to allow the content 106 to be projected in front of the vehicle 102. For example, the content projecting system 104 may be affixed to a front grille of the vehicle 102 as shown in FIG. 1. Alternately or additionally, the content projecting system may be located in, under, beside, and/or on a bumper, a hood, a fender, a roof, or the like. In some embodiments, the content projecting system 104 may be located in a headlamp of the vehicle 102. In the illustrated embodiment of FIG. 1, the content projecting system 104 is located under the hood of the vehicle 102.

The content projecting system 104 may be configured to be installed in a previously manufactured vehicle 102. For example, the content projecting system 104 may be added to an automobile 102 as an aftermarket add-on. In other embodiments, the vehicle 102 may be manufactured to include the content projecting system 104.

Figure 2:
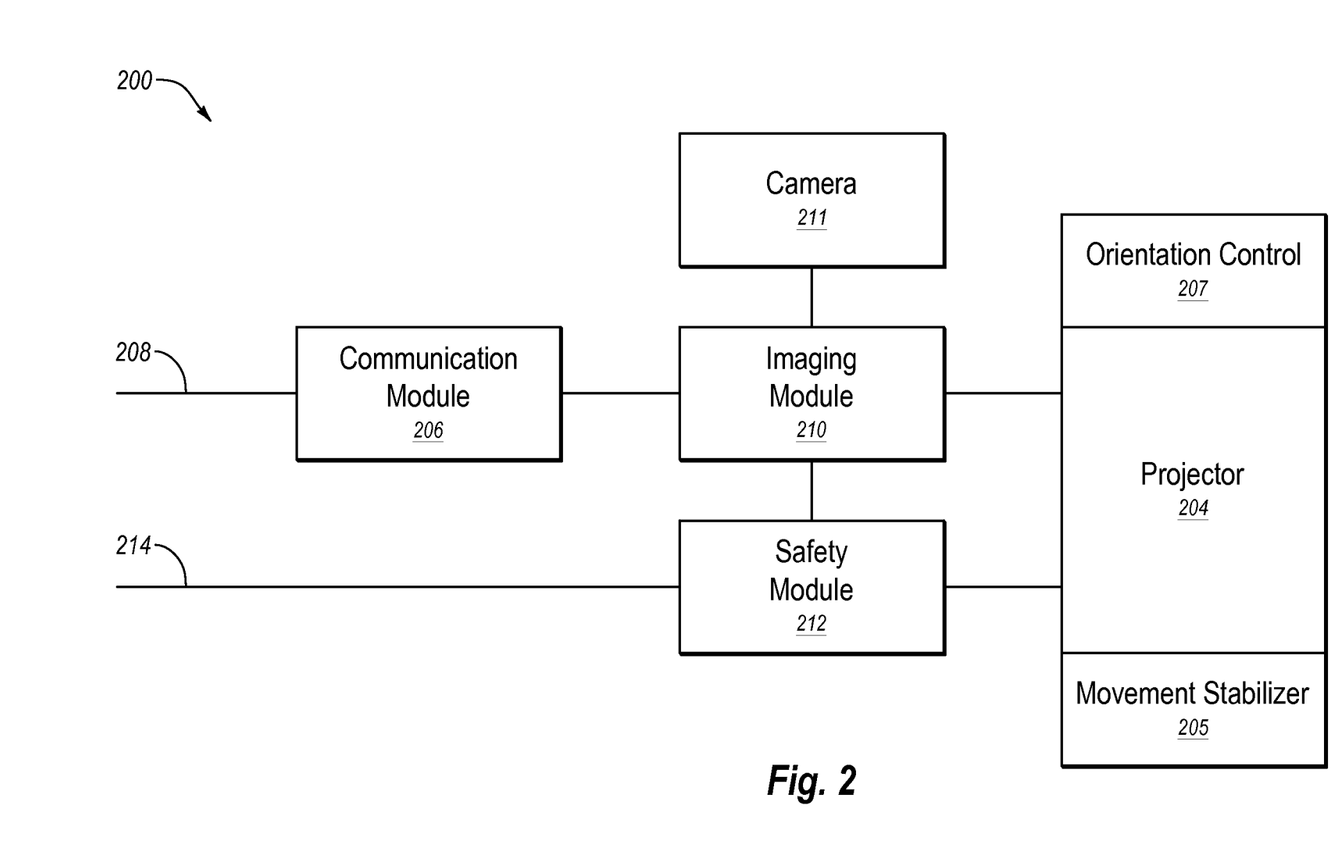
FIG. 2 is a block diagram of an embodiment of the content projecting system of FIG. 1.

FIG. 2 is a block diagram of an embodiment 200 of the content projecting system 104 of FIG. 1 (hereinafter "content projecting system 200"). The content projecting system 200 may receive power from a vehicle and/or may include or be coupled to a power source such as a battery, a solar panel or the like.

The content projecting system 200 includes a projector 204. The projector 204 generally includes a device capable of projecting content. In some embodiments, the projector 204 may be a laser imaging device configured to project content using a laser. For example, a laser-based projector 204 may form line-based content from one or more beams of laser light. Alternately or additionally, the projector 204 may include a digital light processing (DLP) projector, a light emitting diode (LED) projector, a liquid crystal display (LCD) projector, a liquid crystal on silicon (LCOS) projector, or the like.

Although not required, the content projecting system 200 may include a movement stabilizer 205 as illustrated in FIG. 2. The movement stabilizer 205 may be configured to dampen movement of the projector 204 during operation of a vehicle. For example, the movement stabilizer 205 may resist vibration generated by the vehicle's engine, the road, or the like. Dampening movement of the projector 204 may lessen or eliminate a perception that the content is shaking during operation of the vehicle. The movement stabilizer 205 may include one or more gyroscopes, springs, dampers, or the like or any combination thereof.

Optionally, the content projecting system 200 may include an orientation control 207 as illustrated in FIG. 2. The orientation control 207 may be configured to adjust an orientation of the projector 204. The orientation of the projector 204 may be adjusted to allow content to be projected onto a desired surface at a desired location. For example, the orientation of the projector 204 may be adjusted to display content closer to or farther from a vehicle. The orientation of the projector 204 may be adjusted to move the content laterally. For example, the content may be moved laterally to follow the curve of a road so that the content remains on the surface of the road as the vehicle travels along the curve. Alternately or additionally, the orientation of the projector 204 may be adjusted to allow content to be projected on surfaces other than a road. For example, content may be projected on billboards, signs, buildings, earth, vegetation, other vehicles, and the like.

In the illustrated embodiment of FIG. 2, the content projecting system 200 additionally includes a communication module 206. The communication module 206 is configured to receive instructions for the content projecting system 200 to project content. The communication module 206 may receive the instructions over a communication interface 208. The communication interface 208 may be wired to systems within a vehicle in which the content projecting system 200 is installed. Alternately or additionally, the communication interface 208 may be wireless. For example, the communication module 206 may include hardware and/or software configured to allow communication with systems within a vehicle over WLAN, Bluetooth®, ZigBee®, and/or other suitable wireless communication interfaces 208.

Although not required, the content projecting system 200 may additionally include an imaging module 210 as illustrated in FIG. 2. The imaging module 210 may create, format, pre-distort and/or pass along content for the projector 204 to project based on instructions, information, and/or content received by the communication module 206. The imaging module 210 may provide the projector 204 with pre-distorted content such that the projected content appears undistorted from the perspective of a target observer of the projected content to account for the angle of the projection surface with respect to the target observer. For example, if content appears undistorted when projected onto a surface such as the back of a trailer that is normal to the line of sight of the target observer, the same content will appear distorted when projected onto a surface such as a road that is at an acute angle with respect to the line of sight of the target observer. Accordingly, the imaging module 210 can pre-distort the content to compensate for the angle of the projection surface with respect to the target surface so that the content appears undistorted to the target observer. Pre-distorting content to appear undistorted from the perspective of a target observer is described in further detail with reference to FIGS. 3A and 3B.

The content projecting system 200 may additionally include a camera 211 as illustrated in FIG. 2, although not required in all embodiments. The camera 211 may be configured to monitor the appearance of the content on the projection surface. The appearance of content projected onto a projection surface by the projector 204 may be affected by a number of factors, including levels of ambient light in the environment, as well as the shape, color(s) and reflectivity of the projection surface. The camera 211 may provide feedback concerning the appearance of the content to the imaging module 210. The imaging module 210 may consider feedback from the camera 211 to format and/or pre-distort the content to account for those factors affecting the appearance of the content. For example, the imaging module 210 may consider feedback from the camera 211 to adjust the color, intensity, and/or proportions of the content.

Optionally, the content projecting system 200 may further include a safety module 212 as illustrated in FIG. 2. The safety module 212 may be configured to suppress the projector 204 from projecting content during times when projecting the content may be unsafe. In some embodiments, the safety module 212 is configured to selectively instruct the imaging module 210 to ignore content from the communication module 206 and to instead provide the projector 204 with content that provides the target observer with a warning, an indication that the content has been suppressed, and/or a blank image to effectively turn off the projector 204.

Alternately or additionally, the safety module 212 may be configured to identify surfaces that may safely receive projected content without harming a person and/or distracting other drivers. In some embodiments, the safety module 212 may consider threat analytics performed by the vehicle. For example, a vehicle may perform threat analytics through sensors and systems for detecting distractions and/or potential dangers such as pedestrians, animals, other automobiles, foreign objects on or near the road, stationary objects, road damage, signals, known areas of road safety such as busy intersections, traveling in excess of the speed limit, signs, and the like. The vehicle may include such systems as part of self-driving and/or driver assistance systems. In some embodiments, the content projecting system 200 may include similar sensors and systems for detecting distractions and/or potential dangers, and for performing threat analytics.

As illustrated, the safety module 212 includes a communication interface 214 over which threat analytics information may be received from the vehicle and/or any sensors and systems for detecting distractions and/or potential dangers and for performing threat analytics. The communication interface 214 may include a wired and/or a wireless interface similar to the communication interface 208 described above.

Although illustrated as discrete modules and components, the projector 204, the communication module 206, the imaging module 210, and/or the safety module 212 may be divided into additional modules and components, combined into fewer modules and components, or eliminated, depending on the desired implementation.

Figure 3A:
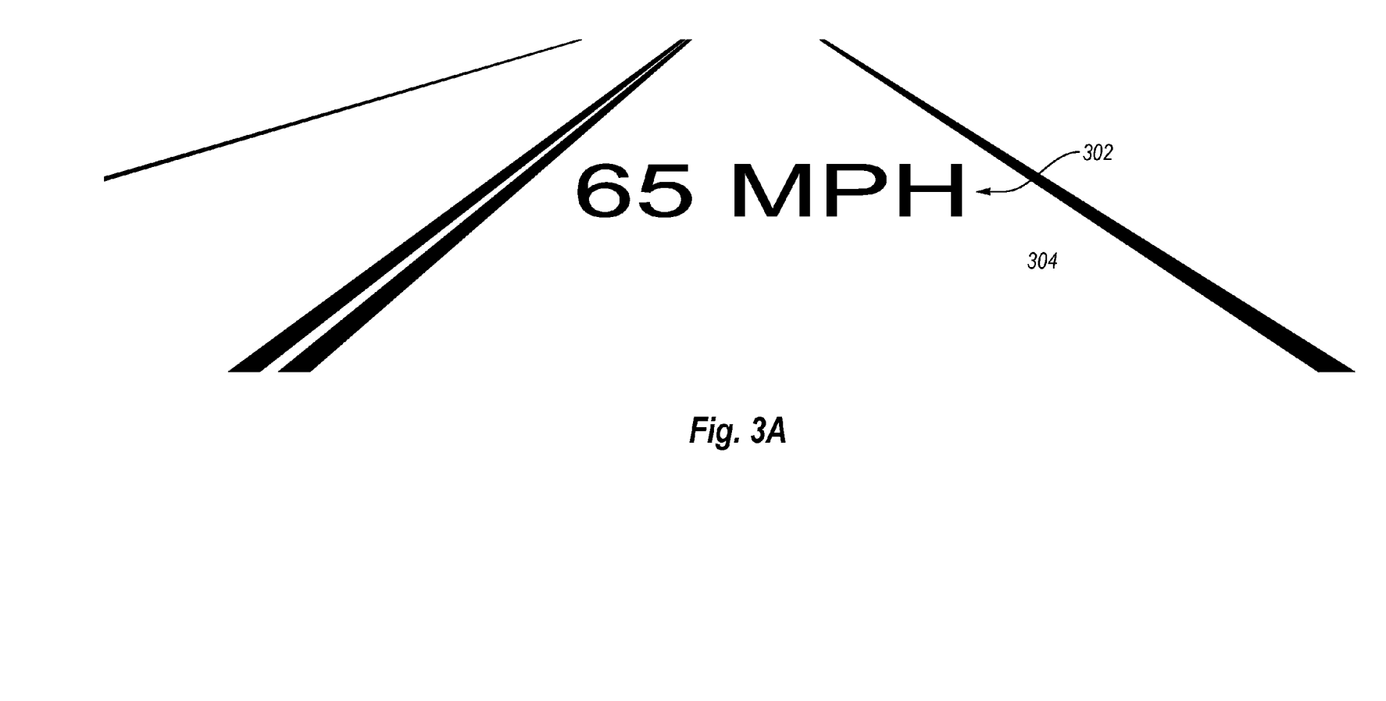
FIG. 3A illustrates example content that may be projected by the content projecting system of FIG. 2 from the perspective of a driver of a corresponding vehicle.

FIG. 3A illustrates example content 302 that may be projected by the content projecting system 200 of FIG. 2 from the perspective of a driver of a corresponding vehicle in which the content projecting system 200 is installed. The content 302 may generally correspond to the content 106 as described with reference to FIG. 1. As shown, the content 302 is projected onto a projection surface 304 so as to have an undistorted appearance from the perspective of the driver.

Figure 3B:
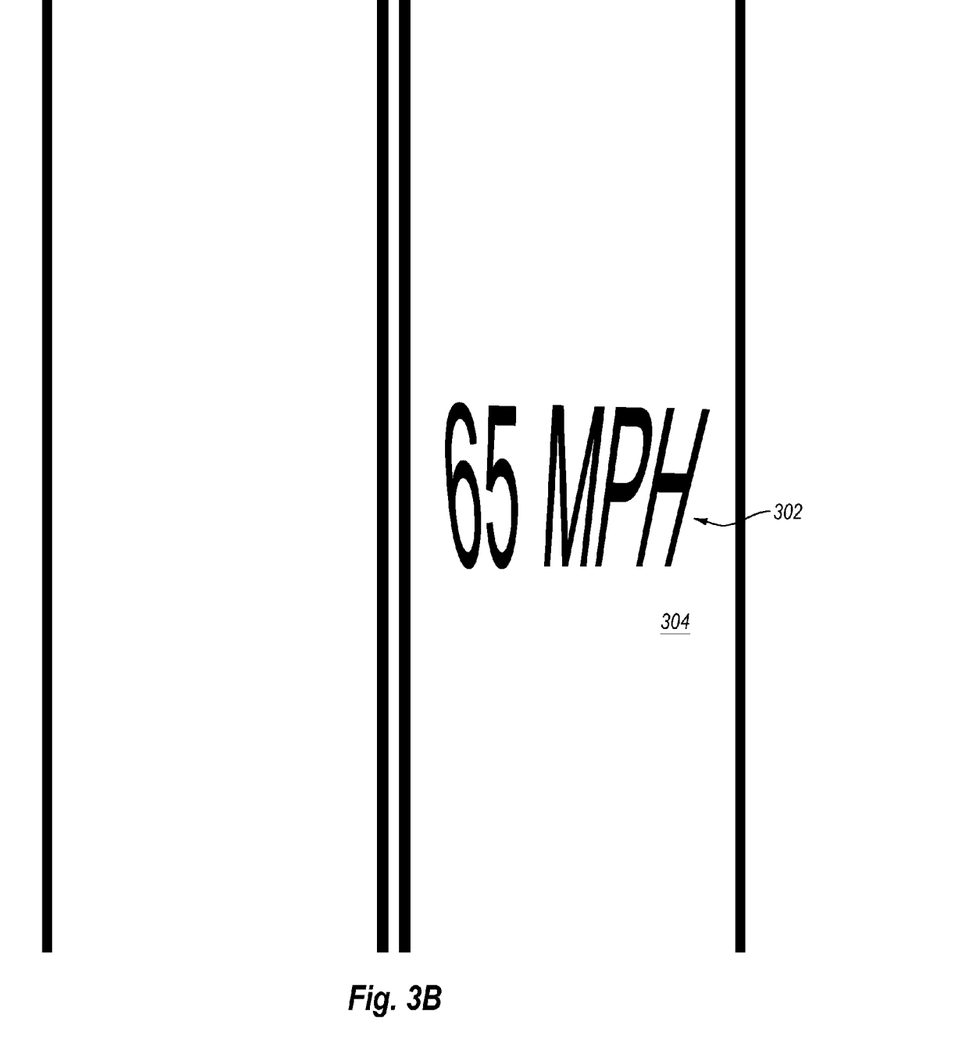
FIG. 3B illustrates a top view of the example content of FIG. 3A.

FIG. 3B illustrates a top view of the example content 302 of FIG. 3A. To cause the content 302 to be undistorted from the perspective of the driver, the content 302 may be pre-distorted by the content projecting system such that the content appears undistorted from the driver's perspective. The content 302 may be pre-distorted to compensate for the angle of the projection surface 304 with respect to the line of sight of the driver. In the example of FIGS. 3A-3B, the content 302 may be pre-distorted so as to appear from directly above as illustrated in FIG. 3B. The pre-distortion of the content 302 may be accomplished by an imaging module generally corresponding to the imaging module 206 described with reference to FIG. 2. Alternately or additionally, pre-distortion of the content 302 may be accomplished by one or more lenses.

The position of the content 302 relative to the driver, the angle of the projection surface 304 with respect to the line of sight of the driver, the position of the content projecting system, and the perspective of the driver may determine how the content 302 is pre-distorted so as to appear undistorted from the driver's perspective. In some embodiments, the position of the projection surface 304 may be determined by the content projecting system and considered in pre-distorting the content 302. For example, the content projecting system may include one or more range finders for measuring one or more distances to the projection surface 304 for use in determining how the content 302 may be pre-distorted. Alternately or additionally, the content projecting system may receive and consider information about the position of the driver within the vehicle. For example, the content projecting system may receive information about the position of the driver's seat for use in determining how the content 302 may be pre-distorted.

In some embodiments, the intensity of the content 302 may also be altered such that the intensity of the content 302 appears to be uniform from the driver's perspective. For example, portions of the content 302 projected farthest from the driver may be altered to be brighter (not shown) than portions of the content 302 projected closer to the driver such that brightness of the content 302 appears to be uniform from the perspective of the driver.

Figure 4:
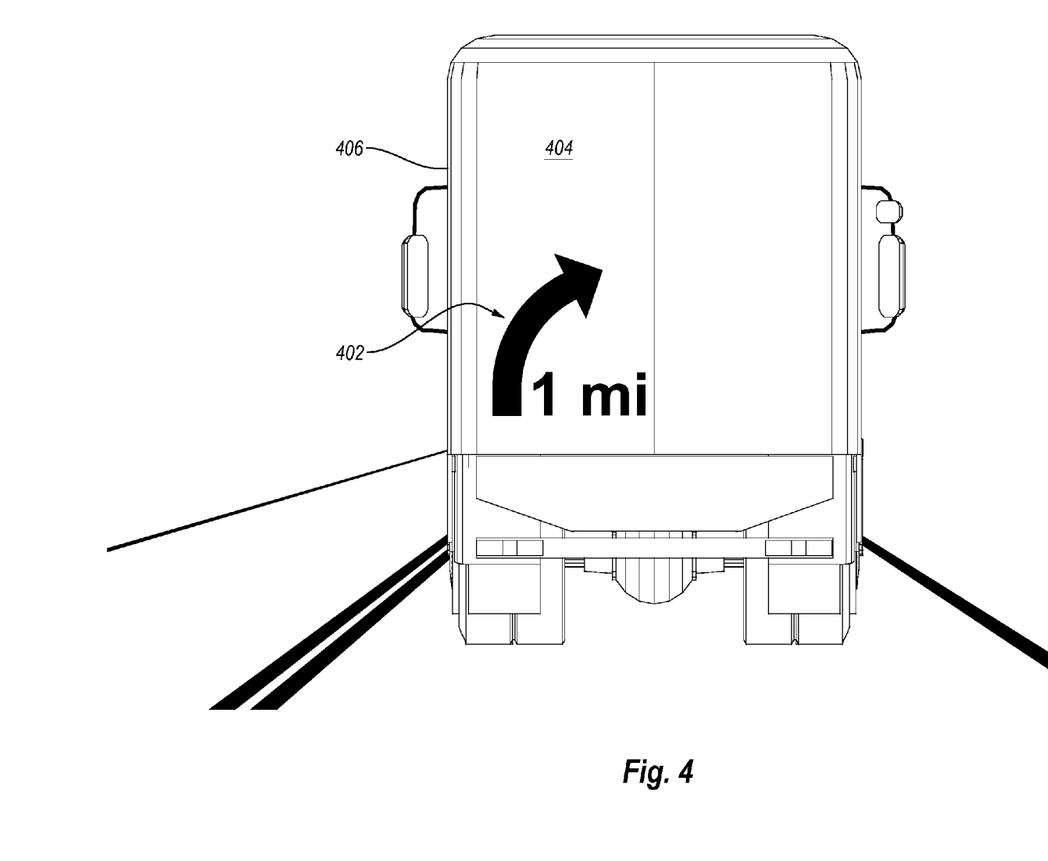
FIG. 4 illustrates example content that may be projected by the content projecting system of FIG. 2 on a back surface of a semi-trailer.

FIG. 4 illustrates example content 402 that may be projected by the content projecting system 200 of FIG. 2 on a back surface 404 of a semi-trailer 406. The content 402 may generally correspond to the content 106 as described with reference to FIG. 1. As illustrated in FIG. 4, projection surfaces are not limited to roads but can include the backs of vehicles in front of the vehicle in which the content projection system is installed. Alternately or additionally, the content 402 may be projected on other surfaces, such as billboards, buildings, earth, vegetation, and the like (not shown).

In some embodiments, the content projecting system may avoid projecting content 402 onto particular surfaces. For example, the content projecting system may avoid projecting content onto windows, minors, people, and/or other surfaces to the extent that doing so may harm and/or distract other people, including other drivers. To this end, the content projecting system may include cameras and/or sensors to identify surfaces to be avoided when projecting content 402. Alternately or additionally, the content projecting system may use information collected by the safety module 212 as described with reference to FIG. 2 to identify surfaces to be avoided when projecting content 402.

Figure 5A:
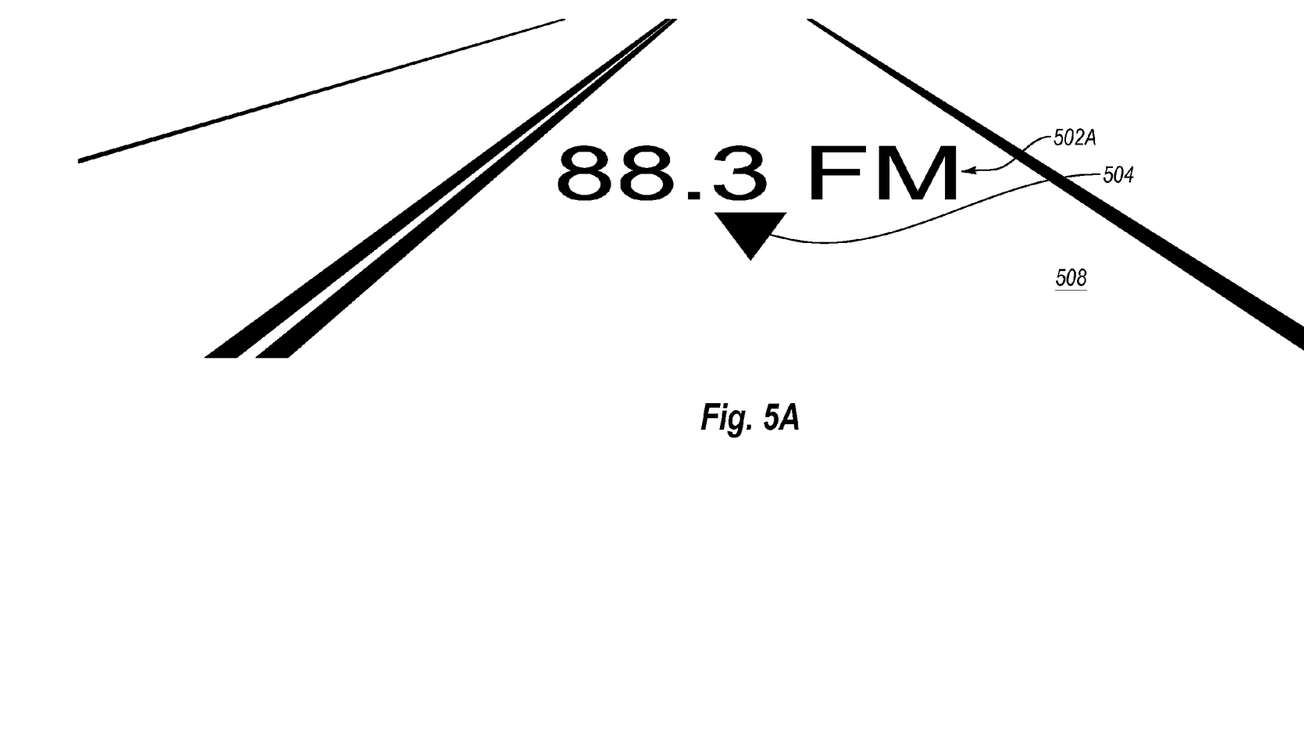
FIGS. 5A-5B illustrate other example content that may be projected by the content projecting system of FIG. 2 from the perspective of a driver of a corresponding vehicle.
Figure 5B:
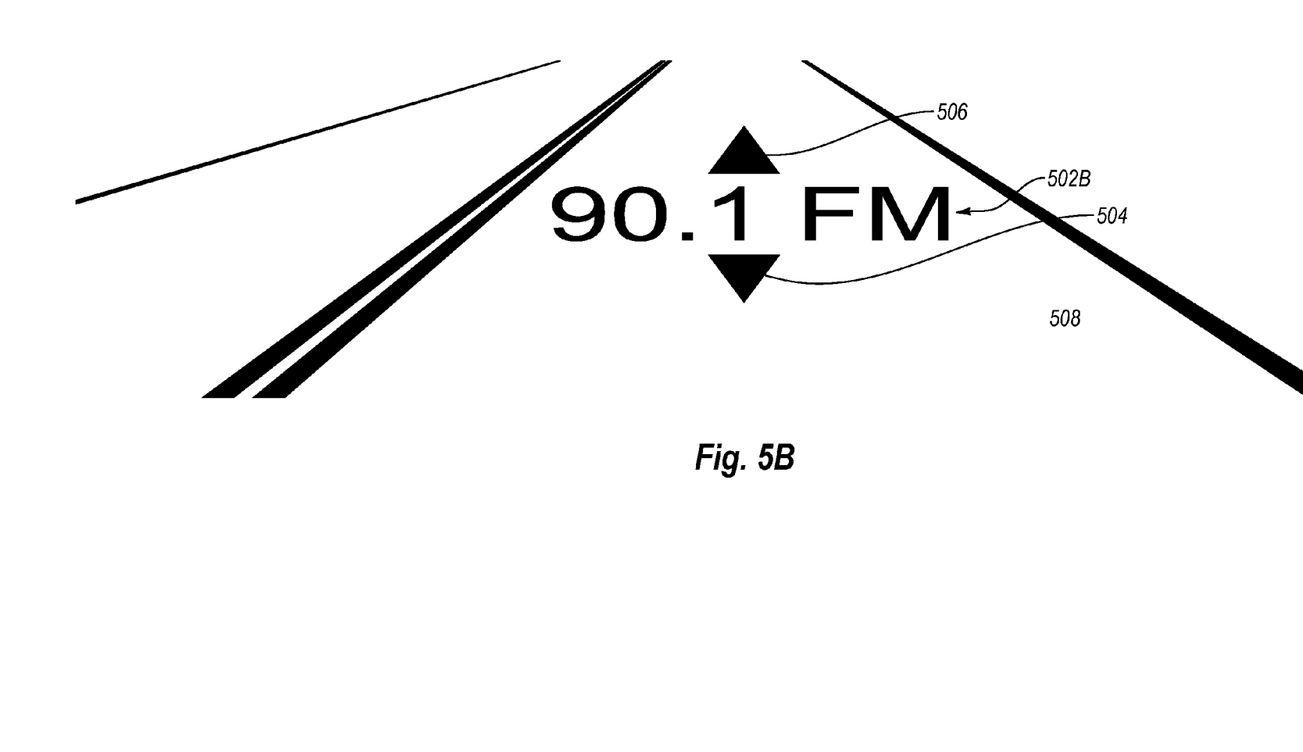

FIGS. 5A-5B illustrate other example content 502A, 502B that may be projected by the content projecting system 200 of FIG. 2 from the perspective of a driver of a corresponding vehicle. FIGS. 5A-5B illustrate how the content projecting system may create a user interface that the driver may interact with without requiring the driver to focus on a user interface inside of the vehicle.

In more detail, the content 502A of FIG. 5A may be changed in response to an input from an occupant and/or a driver of the vehicle. The content 502A is projected onto a projection surface 508. The content 502A may display information relating to an option available to the driver. In some embodiments, the driver may provide input at an input interface affixed to a steering wheel of the vehicle. The input interface may include an input that may allow the driver to select the option relating to the content 502A. For example, if the driver selects the option displayed in FIG. 5A, the vehicle's radio may tune to 88.3 FM and the station's audio broadcast may be played over the vehicle's audio system.

The content 502A may include a down-facing arrow 504 to indicate to the driver that a down input may present the driver with additional options. If the driver selects the down input, e.g., by pressing a corresponding button on the steering wheel of the vehicle, the content 502A may change. Although shown as a down-facing arrow 504, other indicators may be used to indicate that additional options may be available to the driver.

In response to the driver's input, the content 502A of FIG. 5A may be changed to the content 502B of FIG. 5B and to a new option for the driver to potentially select. As illustrated in FIG. 5B, the content 502B includes an up-facing arrow 506, which may indicate to the driver that an up input allows the driver to return to the previous content 502A and the previous option of FIG. 5A. The content 502B may also include the down-facing arrow 504.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A content projecting system comprising:
a communication module configured to receive an instruction to project content;
a projector configured to:
be affixed to a vehicle; and
project the content onto a projection surface separate from the vehicle; and
a safety module configured to suppress the projector from projecting the content when a threat analytic exceeds a threshold.

2. The content projecting system of claim 1, wherein the projector is further configured to project the content onto the projection surface such that the content is at least partially viewable by an occupant of the vehicle.

3. The content projecting system of claim 2, further comprising an imaging module configured to pre-distort the content such that the content appears substantially undistorted from a perspective of the occupant when projected onto the projection surface.

4. The content projecting system of claim 3, wherein the projection surface comprises a road on which the vehicle may travel and wherein pre-distorting the content includes pre-distorting the content such that when projected onto the projection surface and viewed from directly above, portions of the content further from the vehicle are widened compared to portions of the content closer to the vehicle.

5. The content projecting system of claim 2, wherein the content projecting system is configured to perform an action relating to the projected content in response to an input from the occupant of the vehicle.

6. The content projecting system of claim 2, wherein the content projecting system is configured to change the content in response to an input from the occupant of the vehicle.

7. The content projecting system of claim 1, wherein the content is configured to convey information provided by at least one of: the vehicle, a component of the vehicle, and a mobile device.

8. The content projecting system of claim 7, wherein the information includes at least one of: a state of the vehicle, a state of an audio system, a navigation instruction, a set of destination addresses, and information from an application executing on a mobile device of an occupant of the vehicle.

9. The content projecting system of claim 1, wherein the projector comprises a laser configured to project at least a part of the content onto the projection surface via light generated by the laser.

10. The content projecting system of claim 1, wherein the projection surface includes a surface of at least one of: a road, an automobile, a billboard, and a street sign.

11. The content projecting system of claim 1, wherein the safety module is further configured to suppress the projector from projecting the content onto an unsafe surface.

12. The content projecting system of claim 1, further comprising a movement stabilizer configured to dampen movement of the projector during operation of the vehicle.

13. The content projection system of claim 1, further comprising a camera configured to monitor the appearance of the content on the projection surface.

14. The content projection system of claim 13, further comprising an imaging module coupled to the camera via a feedback loop, the imaging module configured to adjust at least one of:
 a color of the content,
 an intensity of the content, and
 a proportion of the content,
based at least in part on feedback from the camera.

15. The content projecting system of claim 1, wherein the projector is further configured to project the content onto the projection surface such that the content is at least partially viewable by an observer outside of the vehicle.

16. A vehicle comprising:
 a communication module configured to receive an instruction to project content configured to convey information to an operator of the vehicle;
 an imaging module configured to pre-distort a proportion of the content such that the content appears substantially undistorted from a perspective of the operator when projected onto a projection surface separate from the vehicle;
 a projector configured to project the content onto the projection surface separate from the vehicle such that the content is at least partially viewable by the operator of the vehicle; and
 a safety module configured to suppress the projector from projecting the content when a threat analytic exceeds a threshold.

17. The vehicle of claim 16, wherein the vehicle comprises a bicycle and the content comprises navigation information.

18. The content projecting system of claim 1, wherein the vehicle comprises a bicycle and the content comprises navigation information.

19. A method of projecting content, the method comprising
 receiving, at a content projecting system coupled to a vehicle, content to project onto a projection surface separate from the vehicle;
 pre-distorting the content such that the content appears substantially undistorted from a perspective of an occupant of the vehicle when projected onto the projection surface;
 determining whether a threat analytic exceeds a threshold; and
 projecting the pre-distorted content onto the projection surface when the threat analytic does not exceed the threshold; or
 suppressing projection of the pre-distorted content onto the projection surface when the threat analytic exceeds the threshold.

20. The method of claim 19, wherein the vehicle comprises a bicycle and receiving content to project onto the projection surface separate from the vehicle comprises receiving navigation information to project onto the projection surface separate from the bicycle.

* * * * *